United States Patent [19]
Goldberg et al.

[11] Patent Number: 5,587,749
[45] Date of Patent: Dec. 24, 1996

[54] APPARATUS AND METHOD FOR READING MOTION PICTURE FILM PHOTOGRAPHIC DYE SOUNDTRACKS

[75] Inventors: Paul R. Goldberg, Palo Alto; Martin J. Richards, Redwood City, both of Calif.

[73] Assignee: Dolby Laboratories Licensing Corporation, San Francisco, Calif.

[21] Appl. No.: 337,327

[22] Filed: Nov. 9, 1994

Related U.S. Application Data

[63] Continuation-in-part of Ser. No. 322,830, Oct. 13, 1994.

[51] Int. Cl.⁶ .................................................. G03B 31/02
[52] U.S. Cl. ................................................. 352/27; 352/37
[58] Field of Search .................................. 352/26, 27, 5, 352/37; 369/14; 179/100.3 K

[56] References Cited

U.S. PATENT DOCUMENTS

| | | |
|---|---|---|
| 2,551,086 | 5/1951 | Ball et al. . |
| 3,592,648 | 7/1971 | Keller et al. . |
| 3,959,655 | 5/1976 | Mauer . |
| 3,969,593 | 7/1976 | Vlahos .................... 179/100.3 K |
| 4,075,018 | 2/1978 | Custer . |
| 4,085,296 | 4/1978 | Keegan . |
| 4,235,531 | 11/1980 | McCormick . |
| 4,367,930 | 1/1983 | Kolb, Jr. . |
| 4,651,313 | 3/1987 | Guez ................................ 369/14 |

FOREIGN PATENT DOCUMENTS

| | | |
|---|---|---|
| 0268704 | 6/1988 | European Pat. Off. . |
| 8203279 | 9/1982 | WIPO . |
| 9206409 | 4/1992 | WIPO . |

OTHER PUBLICATIONS

"Revolutionary New Film Sound Track Demonstrated at SMPTE Convention" by Syd Cassyd; *Box Office* Jun. 10, 1974, pp. 10–11.

"A Report on the 115th SMPTE Technical Conference" *Journal of the SMPTE*, Jun. 1974, pp. 521–522.

"Report of the Color Committee," *Journal of the Society of Motion Picture Engineers*, Jul. 1937, pp. 54–56.

"Reproduction of Color Film Sound Records," R. Görisch and P. Görlich, *Journal of the Society of Motion Picture Engineers*, Sep. 1944, pp. 206–213.

"Report of the SMPE Committee on Color," *Journal of the Society of Motion Picture Engineers*, Dec. 1945, pp. 397–400.

"A Phototube for Dye Image Sound Track," A. M. Glover and A. R. Moore, *Journal of the Society of Motion Picture Engineers*, May 1946, pp. 379–386.

"Preliminary Sound Recording Tests with Variable–Dye Tracks," R. O. Drew and S. W. Johnson, *Journal of the Society of Motion Picture Engineers*, May 1946, pp. 387–404.

"Behavior of a New Blue–Sensitive Phototube in Theater Sound Equipment," J. D. Phyfe, *Journal of the Society of Motion Picture Engineers*, May 1946, pp. 405–408.

(List continued on next page.)

*Primary Examiner*—Russell E. Adams
*Attorney, Agent, or Firm*—Thomas A. Gallagher

[57] ABSTRACT

Analog sound tracks are recorded on a single one of the three dye layers present in a color motion picture film, one of the same dye layers that is used for the color picture information. The single dye layer, preferably the cyan dye layer, is read out using a narrow spectrum, substantially monochromatic light source, preferably a red light-emitting diode (LED), the spectrum of which is such as to be maximally absorbed by the dye layer and to remain well within the absorption range of the dye layer even when the dye layer color characteristics vary among film batches. The resulting lower-cost and environmentally-safer silverless analog-audio soundtracks have playback characteristics extremely close to conventional analog audio soundtracks prepared with silver.

2 Claims, 4 Drawing Sheets

OTHER PUBLICATIONS

"A Technological History of Motion Pictures and Television", Raymond Fielding editior, *Univ. of California Press, Berkeley,* 1967, pp. 205–220.

"The Story of Optical Sound Recording with 8mm—Type S (Super–8) Film," Keiji Tanaka, *Journal of the Society of Motion Picture and Television Engineers,* Feb., 1974, pp. 114–116.

"Improving 8mm—Type S (Super–8) Optical Sound by Design of Film and Recording System," Keiji Tanaka, *Journal of the Society of Motion Picture and Television Engineers,* Feb. 1974, pp. 117–124.

"A New Photographic Recording System for the Multi–Track, Variable–Density, Hue–Modulated, Push–Pull Color Sound Track," Frank E. Pontius, *116th SMPTE Conference—Toronto, Nov. 11–15, 1974.*

"A Wide–Range, Noise–Immune, Three–Channel, Variable–Density, Push–Pull Color Photographic Sound Track for Motion Pictures," Petro Vlahos, *116th SMPTE Conference—Toronto,* Nov. 11–15, 1974.

"ST8: A New Agfa–Gavaert Sound Negative Film Especially Suitable for Super 8," K. Staes et al, *Journal of the Society of Motion Picture and Television Engineers,* Aug. 1975, pp. 593–596.

"The Production of Wide–Range, Low–Distortion Optical Soundtracks Utilizing the Dolby Noise Reduction System," *Journal of the Society of Motion Picture and Television Engineers,* Sep. 1975, pp. 720–729.

"The Relative Output of Optical Soundtracks," J. Dexter Clifford, et al, *Journal of the Society of Motion Picture and Television Engineers,* Sep. 1975, pp. 730, 731.

*SMPTE Recommended Practice,* "Spectral Response of Photographic Audio Reproducers for 8–mm Type S Motion–Picture Film", RP 109, Approved 7 Nov. 1982.

"The Filmmaker's Handbook," Edward Pincus, et al., *New American Library, New York, 1984, pp. 330–332.*

"Motion Picture Film Processing," Dominic Case, *Focal Press, Butterworth & Co.* Boston, 1985, pp. 40, 41, 136, 137, 144, 145.

"Audio Engineering Handbook," K. Blair Benson, editor, *McGraw–Hill,* 1988, pp. 12.19–12.21, 12.29–12.41, and 15.49–15.52.

SMPTE Recommended Practice, "Spectral Response of Photographic Audio Reproducers for 8–mm Type S Motion–Picture Film," RP 109–1994, Approved Feb. 8, 1994.

"Is Redevelopment of Optical Soundtracks on Gevacolor Print Film T 9.85 Still Required?," K. Staes, et al, *Journal of the Society of Motion Picture and Television Engineers,* Apr. 1974, pp. 284–287.

Sony SDDS Player System, Sony Dyamic Digital Sound operation manual, 1st edition, date unknown.

APPARATUS AND METHOD FOR READING MOTION PICTURE FILM PHOTOGRAPHIC DYE SOUNDTRACKS

CROSS-REFERENCE TO RELATED APPLICATION

This application is a continuation-in-part of our copending U.S. Pat. application Ser. No. 08/322,830, filed Oct. 13, 1994, Attorney's Docket No. DOL032.

FIELD OF INVENTION

This invention relates to an apparatus and method for preparing and reading optically recorded soundtracks, which are formed from organic-dye-based compounds and contain no silver or virtually no silver. These soundtracks are recorded on color motion picture film using one of the existing dye layers in a tri-pack color film.

BACKGROUND OF THE INVENTION

History

Optical soundtracks for motion pictures were first demonstrated around the turn of the century, and since the 1930's have been the most common method of presenting sound with motion pictures. For analog optical soundtracks, the principle of operation is to first have an exciter lamp illuminate a narrow slit, which is perpendicular to the direction of film travel. A lens focuses the image of this slit onto the emulsion side of the film's analog soundtrack. This soundtrack runs parallel to the direction of film travel and lies between the picture and the sprocket holes. Located on the other side of the film, opposite the light source, a photocell or solar cell detects the amount of light passing through the film, and the current or voltage produced by the illuminated cell is amplified and ultimately sent to the theater's loudspeaker system. In modern systems, the transmission of light through the film is modulated by variations in soundtrack width, where an ideally transparent varying width of soundtrack is situated within an ideally opaque surrounding. This type of soundtrack is known as "variable area".

The first variable area soundtracks had one fixed edge, with the other edge a distance apart which varied with the required audio modulation. This type of optical soundtrack is referred to as "unilateral". The varying clear width causes the required modulation in light transmission received by the cell. It was realized in the late 1930's that error in light uniformity along the width of the slit results in the creation of distortion components. For example, a fall off in illumination at that end of the slit that corresponded to peak modulation level causes significant second harmonic distortion. In an effort to reduce this effect and other geometric distortion components, the "bilateral" variable area track was introduced. This format has two modulated edges, identical mirror images around a fixed centerline. This technique is immune to constant slope slit illumination error, but will develop distortion components under parabolic light error conditions.

Figure 1:
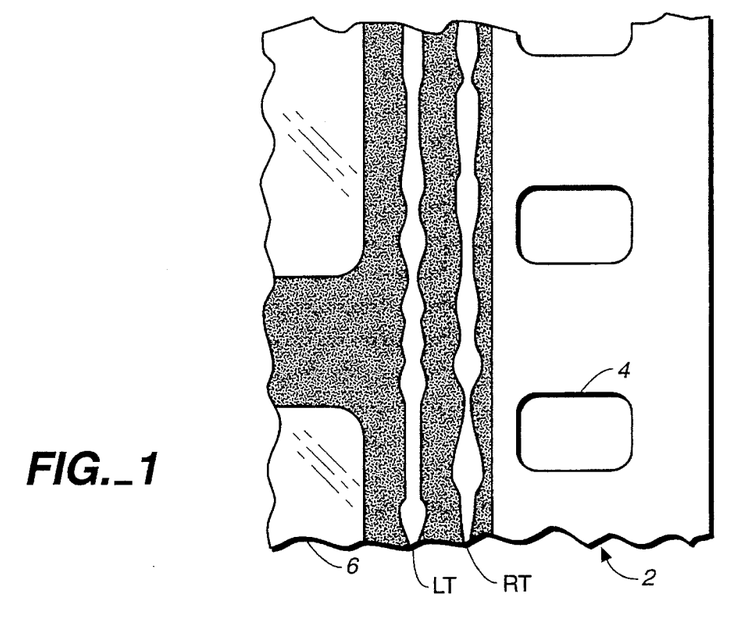
FIG. 1 is a schematic representative of a portion of a conventional 35 mm motion picture film 2.

A later development, which is now the standard monaural analog optical soundtrack format, is called "dual bilateral" (or "double bilateral" or "duo-bilateral") sound track. This format has two bilateral elements within the same soundtrack area, thus providing further immunity from illumination non-uniformity errors. In the mid 1970's Stereo Variable Area (SVA) tracks became increasingly popular, in which two independently modulated bilateral soundtracks are situated side by side in the same area as the normal monaural (mono) variable area track. FIG. 1 shows a portion of a representative 35mm motion picture film 2. The left total soundtrack is labeled "LT" and the right total soundtrack is labeled "RT". The film has sprocket holes 4 and picture areas 6. A two element solar cell is used in this case to provide two independent output signals, one derived from each of the two bilateral soundtracks.

Required Soundtrack Characteristics

As previously stated, in variable area recording the soundtrack consists of transparent and opaque areas. In order to faithfully modulate the light energy, emanating from the reproducing projector's exciter lamp, in correspondence to the original sound wave forms, high contrast between the two regions is a necessity. That is, the opaque region should display a high optical density as compared to the transparent region, which should display as low an optical density as possible. In addition, the dividing line between the two regions should be very sharp. Since solar cells in 35mm projectors are quite sensitive in the infrared region (they have a broad spectral response and their peak response is typically close to 900 nm in the infrared range) and the traditional exciter lamp assembly employs an incandescent light source which produces most of its light output in the infrared region, the soundtrack on the release print must exhibit high density in the infrared portion of the light spectrum. Unfortunately, the dyes used in all color prints have a very low absorption in the infrared region. In order to provide a soundtrack on color stock which exhibits high density in the presence of infrared light energy, current practice calls for the restoration of the original silver image in the soundtrack area during color release print processing. This process is known as "redevelopment". Silver soundtracks are substantially opaque throughout the visible and infrared spectrum.

Figure 2:
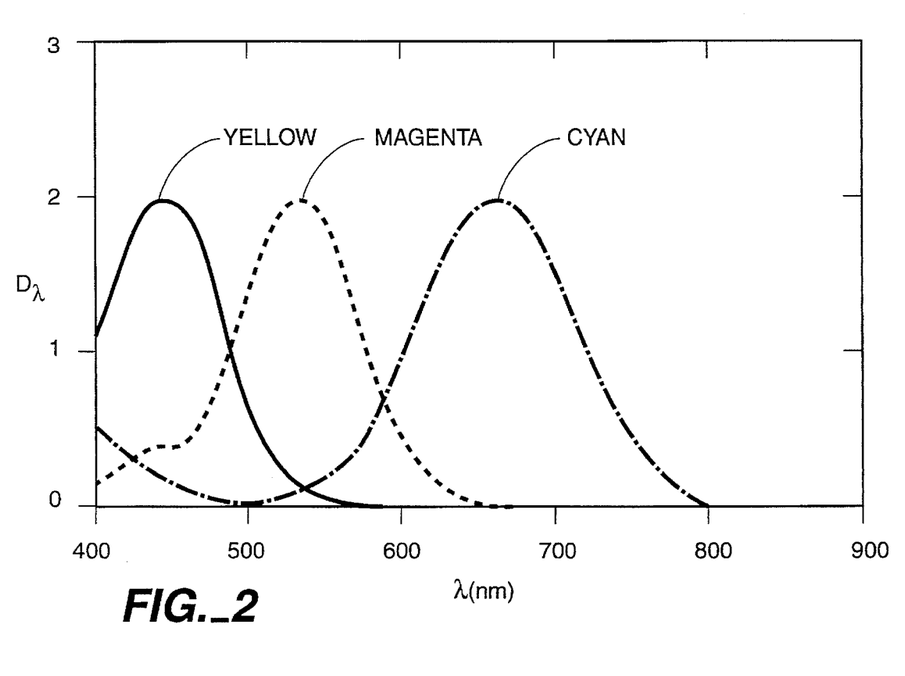
FIG. 2 is a graphical representation of the absorption characteristics of the three conventional motion picture color film organic dye layers: yellow, magenta and cyan.

FIG. 2 shows the absorption characteristics of the three conventional motion picture color film organic dye layers: yellow, magenta and cyan. If shown, the absorption characteristic of silver would be an essentially straight line extending parallel to the base line (into the infrared range above 700 nm where the standard solar cell is most sensitive) at an absorption level somewhat above the maximum absorption of the peaks of the three dye layers. The conventional practice is to expose only the magenta and cyan dye layers.

Figure 3:
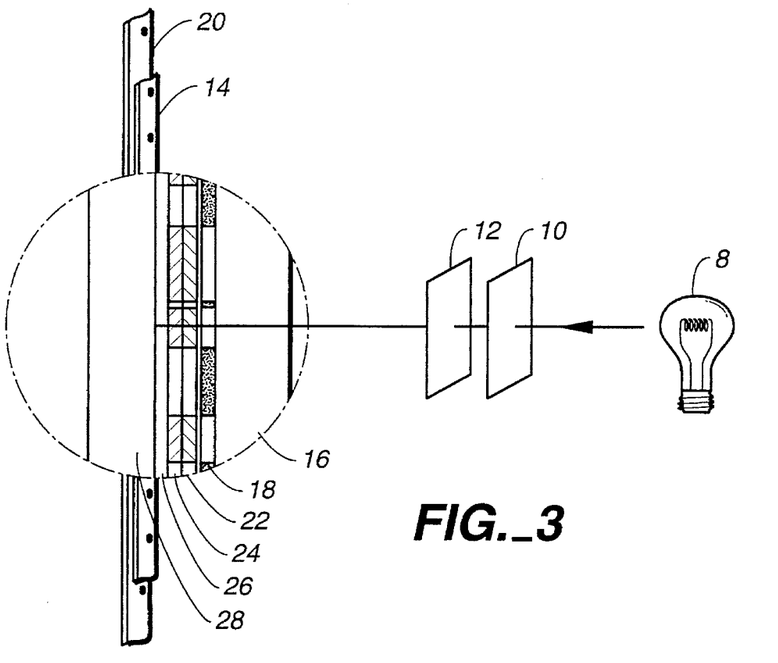
FIG. 3 is a schematic representation of a prior art contact printing arrangement for the soundtracks of motion picture color film.

Modern color printing processes expose only the top two layers of the emulsion, magenta and cyan, in the soundtrack area. This provides sufficient density, and results in a sharper track image than if all three layers are used, with a correspondingly better high frequency response. Contact printing is employed as shown in FIG. 3. Light from a wide spectrum light source 8 passes through a Wratten 12 yellow filter 10, which removes blue light, and a Wratten 2B filter 12, which eliminates ultraviolet radiation. The resulting red and green light then passes first through a sound negative 14, consisting of a base 16 and an emulsion 18. It then passes through the color print 20 with which it is in contact, the clear portions of the negative allowing the light to pass thereby exposing the magenta and silver layer 22, the cyan and silver layer 24 and leaving the yellow layer 26 unexposed. The dye layers are supported by a base 28.

In color positive processing, magenta and cyan track images are reproduced together with corresponding silver images in these two layers. The silver gives the soundtrack its characteristic dark purple-blue appearance. A track that has not been redeveloped, and therefore contains no silver displays a saturated bright blue color.

Reading Dye Soundtracks

Attempts have been made to read un-redeveloped "blue" two-dye-layer soundtracks. As previously discussed, both the light energy used by conventional soundtrack playback mechanisms to interrogate analog soundtracks and the sensitivity of the light sensing element employed to detect the modulated light, fall mostly in the infrared portion of the spectrum. Only the silver reintroduced into the dye analog soundtrack by redevelopment provides optical density in the near infrared region just above 700 nm, where the projector's analog sound reading mechanism functions efficiently. Attempts to read dye-only soundtracks by using incandescent light sources with conventional photocell elements have produced very poor results because large amounts of unmodulated background light (in all regions of the light spectrum) pass through the dye track, thus causing a high unmodulated background light level and significantly lowering the contrast between exposed and unexposed portions of the soundtrack. This low contrast causes a lower level of soundtrack amplitude along with large amounts of distortion and noise as well as a poor overall high-frequency response.

A filter or a combination of filters may be used in front of incandescent exciter lamps to remove unmodulated light energy in the infrared portion of the spectrum as well as to tailor the remaining visible light to match the absorption characteristics of the soundtrack dyes. However, in order to obtain sufficient visible light energy, and thus sufficient soundtrack amplitude, greater lamp current is required. In many cases the exciter lamps employed are already running close to their maximum light output. Attempting to increase lamp current under these conditions causes the lamp to fail very quickly.

An alternative approach is to interpose a preamplifier between the solar cell output and the input of the photocell amplifier already present in soundtrack processing equipment. If a standard colored glass type filter is employed in combination with an infrared blocking filter, the additional gain required may be obtained without the introduction of significant electronic noise. This configuration will improve dye soundtrack reproduction, but since the traditional glass filter passes a rather wide spectrum of light energy, the resulting audio signal will still display a greater amount of distortion and noise than the equivalent silver track.

All of the light in the visible region of the spectrum that is filtered out by the glass filter is turned into heat. Thus, over a period of time, which could be quite short depending on the filter chosen and the brightness of the incident illumination source, heat will cause the filter's optical characteristics to change and eventually the filter will fail. A narrow band interference filter may be employed instead of a filter combination, but this filter type is quite costly. In addition, an interference filter with narrow band characteristics will pass less than 5% of the light energy that falls on its surface. Thus, the signals emanating from the solar cell require a large amount of amplification in order to be useful and the filter becomes very hot. As previously mentioned, heat significantly reduces the life expectancy of all optical filters. In the case of the interference filter, the heat causes the deposited metallic layer to become nonuniform in its optical characteristics and eventually separate from its glass substrate.

Soundtrack Redevelopment

In the standard color process, the silver component of the image is almost completely removed. As mentioned above, silver must be retained in the soundtrack area to make it suitable for playback on projection equipment employing current soundtrack reading technology. It is for this reason that the soundtrack area is "redeveloped". The following outlines the typical process employed to achieve redevelopment. Immediately after color development, the film is passed through a stop bath and into a first fixer. This removes silver bromide only from unexposed areas, leaving a silver-plus-dye image in both picture and soundtrack. Bleaching then converts the exposed silver back into silver bromide. After a short rinse and superficial drying, the film is passed into a soundtrack applicator station where a redeveloper stripe is applied. A conventional black and white developer with a cellulose compound, such as nitrosyl, is employed. The resulting compound is a thick, highly viscous solution. This solution is striped only onto the soundtrack area of the film where it develops the silver bromide once again to a silver image. The picture area remains unaffected. After about thirty seconds the redeveloper is washed off by spray jets of water and the film is passed through the remaining solutions of the color process. Fixing removes the silver halide from the picture area, but leaves the silver in the soundtrack area.

Difficulties Associated With Redeveloped Soundtracks

The redevelopment process has a number of difficulties. The two most serious difficulties are the cost and the rapidly growing requirement to protect the environment.

Cost

From the cost standpoint, there is the obvious expense related to an additional process during the development of soundtracks. The redevelopment station described above requires setup, calibration and maintenance on a routine basis. In addition, because it is very important to assure that the redeveloping solution does not splash or migrate into the picture area, careful inspection, on a continuous basis, is also a necessary. Lastly, it is inevitable that redeveloper sometimes finds its way into the picture or sprocket holes areas. In the first case, the edge of the picture takes on a completely different characteristic, thus making the film inappropriate to send to a theater for exhibition. In the second case, the optical characteristics of digital audio data blocks, which are often placed between the sprocket holes of motion picture film for the purposes of providing a multi-channel digital sound presentation, are non-uniformly altered. Although the digital reading mechanism is able to acquire most of the data, occasionally a block of data is so greatly damaged that it is unreadable.

Although these two irregularities cause some motion picture prints to be scrapped, by far the most loss, and therefore the most expense, is caused by incomplete application of the analog soundtrack itself. This incomplete application causes severe audible anomalies that are quite noticeable to an audience.

Apart from the expense associated with the redeveloping activity itself, there is a great deal of cost related to the loss and recovery of silver during the process. Significant amounts of silver are found in the water employed to wash off the redeveloper solution. On a yearly basis this silver is worth hundreds of thousands of dollars. In order not to lose this precious metal, additional expense is incurred in continuing efforts to recover the element from the effluent.

Environmental Concerns

The previous discussion touched upon silver recovery. Although today's silver recovery technology is quite good, dangerous amounts of silver are building up in the environment. Although there are restrictions on the amounts of silver allowable in waste water, environmental protection agencies throughout the world, especially those in the Los Angeles, Calif. area, where much of today's movie film is printed and processed, have made it quite clear that efforts are underway to restrict even further the amount of silver allowable in the discharge from movie film processing activities.

Extremely demanding restrictions that are likely to be imposed on the amount of silver allowable in waste water only address one of the many concerns related to silver escaping into the environment. Multiple billions of feet of movie film are processed and distributed each year. The use of redevelopment places large amounts of silver into the analog soundtracks of these prints. When a print has completed its run and had been worn, damaged or no longer has theatrical value, it must be disposed of. In most cases, movie film is disposed of by grinding the film strips into flakes and using the resulting material as landfill. From this perspective, since almost all of the silver has been removed from the picture area and replaced with dyes, there is no problem with the image portion of the film. The base materials used for release print stock are bio-inert, so there is no problem with the base materials. This leaves the silver in the analog soundtrack to mix with the ground water in contact with the landfill, a situation which is not likely to be allowed to continue.

Much thought has gone into recovering the silver from discarded movie prints, but the processes developed so far are costly. In addition, they are inefficient and not 100% effective. The only practical means to meet the very strict regulations that need to be, and likely will be, imposed on silver escaping into the environment is to require the complete removal of silver from analog soundtracks. Such a requirement would dramatically affect the motion picture industry. This will leave a dye-only analog soundtrack which cannot provide adequate audio quality when current technology is employed.

SUMMARY OF THE INVENTION

In accordance with the teachings of the present invention, analog soundtracks are recorded on a single one of the three dye layers present in a tri-pack color motion picture film. Thus, the dye layer used is one of the same dye layers that is used for the color picture information. The single dye layer is read out using a substantially monochromatic light source, the wavelength of which is such as to be maximally absorbed by the dye layer. Thus, if the cyan dye layer is employed, the light source should be red, the complementary color to cyan.

The cyan dye layer is the preferred dye layer as compared to the other two dye layers for three reasons: (1) a high intensity, relatively inexpensive, substantially monochromatic red light source is available—the red light emitting diode (LED), (2) the cyan layer is the middle layer in modern motion picture release print stock, the magenta layer being the top layer and therefore overlaying and protecting the cyan layer from scratch damage, and (3), the yellow dye employed displays the lowest resolution of the three dyes. LED's currently yielding the highest light output are red, thus making possible an analog reader simply by replacing a tungsten light source with a red LED. The same monochromatic red light source may be used to read re-developed silver soundtracks. Since the red LED emits narrow band red light, the cyan layer, which is opaque to a rather large band of wavelengths in the red region of the spectrum, highly attenuates light emanating from the red LED. This attenuation is very similar to the attenuation provided by a silver track when it is interposed between an incandescent illumination source and a photocell. The same output level is therefore obtained whether reading a cyan dye soundtrack or a silver soundtrack by the use of a red LED. Thus, there is no need to reset gain levels when both single-dye and silver soundtracks are played one after the other. This characteristic of the present invention is an enabling element in the acceptance of dye tracks by the motion picture industry.

Available red LEDs typically emit a spectrum centered at about 640, 660 or 680 nanometers (nm) with a spectral width of about plus and minus 10 to 15 nm. A narrow spectrum, substantially monochromatic source, such as a red LED, or a single spectral line source has the advantage that the light source will remain well within the absorption range of the dye layer even when the dye layer color characteristics vary among film batches.

LEDs have substantial practical advantages—they operate at a relatively "cool" temperature, they do not require very much power, and they are small and easy to mount.

If a faithful reproduction of the original audio program material is to be achieved, the opaque areas associated with the dye analog audio soundtrack must display a high optical density during the reading process, as compared to the transparent areas, which must display as low an optical density as possible. In addition, the dividing line between these two regions must be very sharp. This high contrast requirement is fulfilled by the present invention by utilizing a single layer dye soundtrack which is read by a monochromatic light source whose wavelength has been specifically chosen to match the peak absorption wavelength of the dye.

As an example, the cyan dye used in motion picture film has a broad absorption peak in the visible red part of the spectrum, at about 660 nanometers. When this dye is illuminated at 660 nanometers, by the use of a red LED, maximum light attenuation will be achieved in the exposed areas of tile dye soundtrack, while minimum attenuation will be achieved in the unexposed (transparent) areas of the dye soundtrack. The use of a narrow bandwidth monochromatic light source allows the single dye layer to provide localized high optical density by itself, without the need for added silver.

With only one wavelength of light employed to read tile dye track, and the dye track tailored to provide maximum attenuation at this wavelength, all the light impinging on the track is modulated by the dye track. Even though the absorption spectrum of the dye is quite broad, there is no additional, unmodulated, light energy striking the solar cell to reduce the dye track's visualized contrast. All of this results in unique, silverless, analog audio soundtracks, whose playback characteristics are extremely close to conventional analog audio soundtracks prepared with silver.

A single color layer of motion picture print stock can be exposed by employing a light source whose spectral energy falls into the photosensitive region of the layer being exposed. In the case of the cyan layer, a red light would be used because the cyan layer of motion picture release stock is sensitive only to red light. This layer is called the "cyan" layer because the resulting color visualized after the film is developed is cyan in hue. Recall that cyan is composed of blue and green, or an absence of red. When the "cyan" layer is exposed and developed, it takes on a higher optical density in the red portion of the spectrum, thus attenuating red light. The removal of red light energy causes broad spectrum light passing through the film to be cyan in color. The other color layers of the color motion picture stock, being sensitive only to light of their complementary color (green for the magenta layer and blue for the yellow layer), remain clear and exhibit a low optical density.

A further advantage of the single-dye-layer analog soundtrack is that there is a renewed interest in the imbibition color film printing process. According to that process, each of the three dye colors are printed on the motion picture release print at successive printing stations as the film is transported linearly. The result is a color print exhibiting vibrant colors, but with a slight degradation in resolution due to the inability to provide perfect registration of the successively printed dye colors. Although the somewhat imperfect registration is quite acceptable for the picture, the process would not yield acceptable results if the analog soundtrack consisted of two or three dye layers. Thus, the use of a single dye layer analog soundtrack on such a print is advantageous. In addition, such a dye layer may be printed on the release print at the same time the cyan layer of the picture is printed, therefore an extra printing station along the film transport path is not required to print the soundtrack.

In principle, any dye layer normally present in the film may be used with a complementary narrow spectrum, substantially monochromatic light source. By "monochromatic" is meant substantially no wider than a width comparable to a red LED (or a suitable LED complementary to the yellow or magenta dye layer if such an LED becomes available) discussed elsewhere in this document. Narrow spectrum light sources other than a red LED may be used, for example, a conventional tungsten or xenon source with filtering, or a laser diode. However, the use of filters is not preferred because of gain loss and out-of-band artifacts that result from poor filter characteristics. The advantage of the same output level whether reading a single dye layer or a silver soundtrack applies as well to dye layers other than a cyan dye layer.

Single-layer-dye tracks read with a substantially monochromatic light source in accordance with the present invention provide audio quality nearly equaling the quality routinely obtained from the playback of redeveloped analog soundtracks. In addition, the invention has the benefit of eliminating the environmental impact associated with the processing and disposal of motion picture release prints. At the same time, the cost associated with the preparation of analog soundtracks is substantially reduced by eliminating the requirement to use silver.

As explained above, the present invention calls for the use of a substantially monochromatic light source to acquire analog audio data from a single-layer-dye soundtrack. In addition, although such single-dye-layer soundtracks may be read out by conventional "forward scan" reading mechanisms, it is believed to be useful to employ a "reverse scan" analog audio track reading mechanism, as will be described below. A reverse scan may provide a more even illumination (resulting in greater linearity) and better separation between the LT and RT tracks. Further, it is believed that the "reverse scan" configuration may allow the use of a substantially monochromatic light source with less output illumination than would be required for a "forward scan" configuration.

Figure 4:
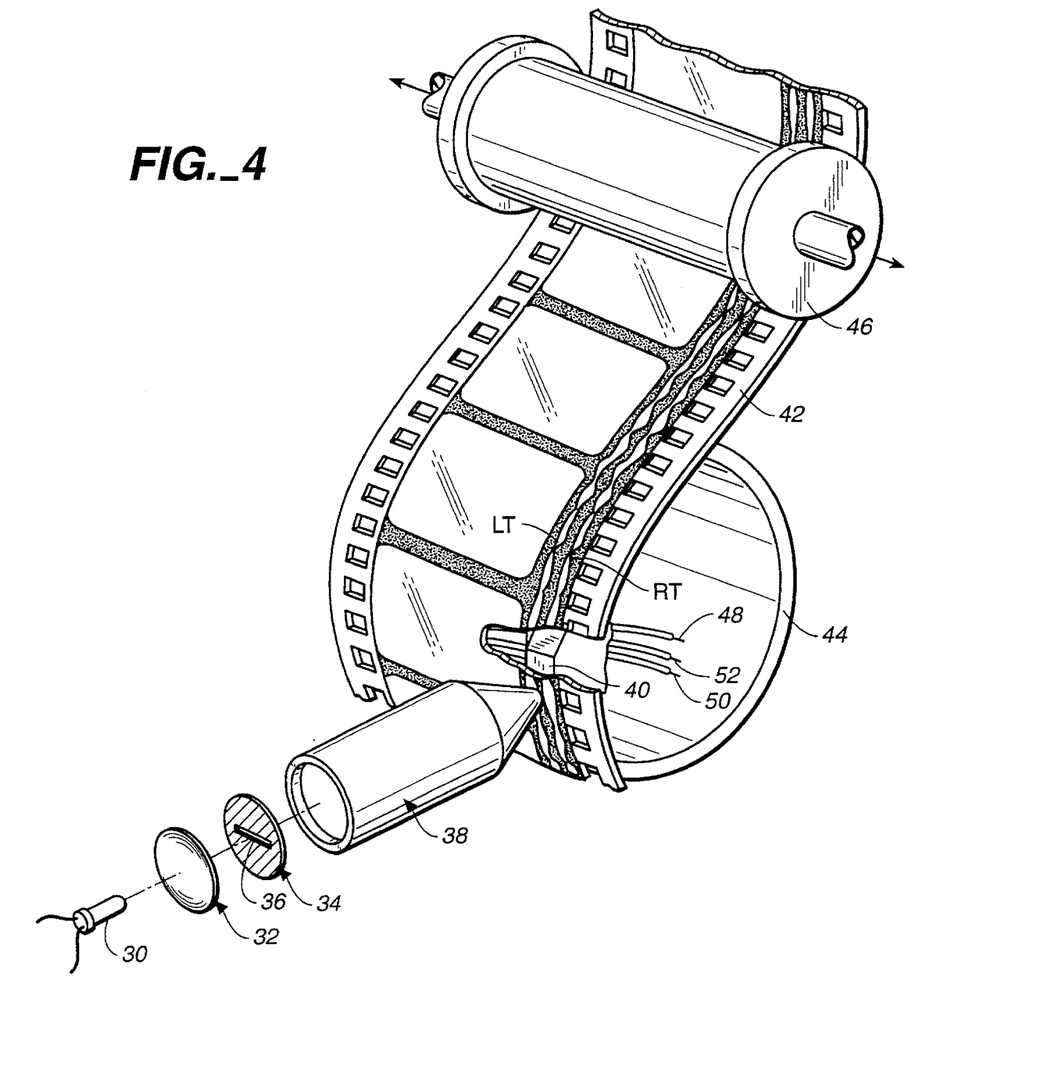
FIG. 4 is a schematic representation of a "forward scan" motion picture projector sound head assembly arrangement useful for practicing the present invention.

The use of an LED illumination source facilitates the use of a reverse scan configuration because of the restricted physical space inside the sound drum, as will become apparent in the representation of FIG. 4. To further improve presentation audio quality, tile reproduced signal may be processed utilizing noise reduction technology.

Preliminary audio performance measurements comparing single-cyan-dye-layer soundtracks read with a red LED to redeveloped analog soundtracks read with conventional soundtrack readers, suggest that the dye soundtrack may exhibit about a 3 dB poorer audio noise performance. This poorer performance is believed to be caused by a microscopic structure in the dye layer, whose smallest elements are larger than the grains of silver which make up the microscopic structure of redeveloped analog soundtracks. This slight increase in noise level may be reduced in two different ways. First, if the above-mentioned belief is correct, it may be possible to reduce the size of tile elements which comprise the dye track by improvements in the manufacturing process. Second, noise reduction techniques may be applied to the reproduced audio signal. For example the spectral recording system of Dolby Laboratories, Inc. of San Francisco and London ("Dolby SR") may be used. Details of Dolby SR are set forth at pages 15.49 through 15.80 of the *Audio Engineering Handbook*, K. Blair Benson, editor, McGraw-Hill Book Company, New York, 1988.

MODES FOR CARRYING OUT THE INVENTION

Medium

The motion picture film employed may be, for example, standard Eastman EXR 5386 or its equivalent. An analog, variable area soundtrack is recorded on only one of the three color-sensitive layers which comprise the photosensitive emulsion of this medium. In the preferred embodiment, the soundtrack is recorded on the cyan layer, but the magenta or yellow layers may be employed. Of the three color layers, the yellow layer is the least preferable to use for the present invention, because this layer, in current motion picture color release stock, has a coarser grain structure compared to the cyan and magenta layers. In addition, the yellow layer is the bottom layer and has the poorest resolution.

If the cyan layer is the layer chosen, it is exposed without exposing the magenta or yellow layers of the film. This is accomplished by the use of a red exposure source. No Wratten filter pack is required. Since the dye which comprises the magenta layer has its peak absorption at approximately 550 nanometers (in the green) and has little or no sensitivity above 630 nanometers (see FIG. 2), the exposure source should contain no light energy below 630 nm in wavelength in order to assure that the magenta layer is not affected. Most often, light in this spectral region is obtained by the use of colored filters placed between a broad spectrum light source and the color film being exposed. A high brightness LED, conventional laser, or laser diode emitting light at wavelengths between 640 and 680 nanometers may also be employed.

The soundtrack to be placed on the release print is carried on a separate soundtrack negative, which is prepared by the use of standard industry practices in the manner described in connection with FIG. 3. To create a cyan dye track on the release print, the sound negative is placed in physical contact with the color motion picture release stock and exposed using one of the exposure sources just described. Thus, with reference to FIG. 3, the Wratten filters 10 and 12 are omitted and the tungsten light source 8 is replaced, for example, by a laser diode, a krypton gas laser or, one or more red LEDs. Thus, only the cyan dye layer 24 is exposed and the other two dye layers remain unexposed.

Figure 5:
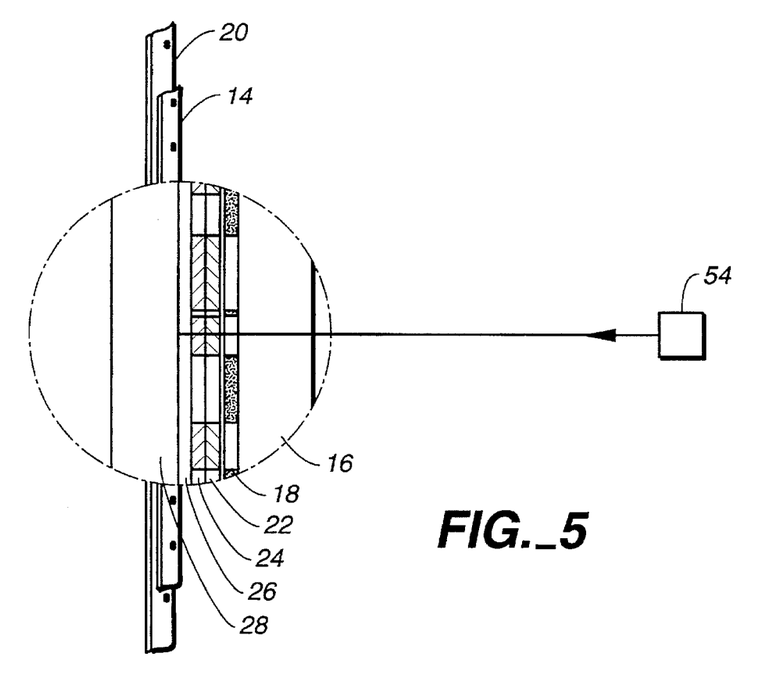
FIG. 5 is a schematic representation of a contact printing arrangement for the soundtracks of notion picture color film in accordance with the teachings of the present invention.

Such an arrangement is shown in FIG. 5, in which the elements common to FIG. 3 retain the same reference numerals. It is preferred that the red light source provide sufficient illumination to expose the print stock at the high printing speeds that are normally employed (900 to 1500 feet per minute, for example). In order to provide such illumination, it is preferred that the light source is a laser diode or a krypton gas laser. Element 54 represents a laser diode or a krypton gas laser source having a narrow bandwidth within the red portion of the spectrum. A suitable commercially available laser diode is the Model SDL-7430, manufactured by Spectra Diode, Inc. The SDL-7430 has a spectral output in the range of 670 to 690 nm and it consumes 0.5 watts while drawing 1.1 amps. A krypton gas laser that may be usable is the Model 930-k, manufactured by American Laser Corporation. The 930-k is a 6 watt multi-mode krypton gas laser having a spectral output in the range of 647 to 676 nm. Alternatively, sufficient red illumination for high speed printing may be achieved by placing a plurality of red LEDs in parallel at one end of a fiber optic bundle and locating the other end near the printing station.

Apparatus

Illumination Source

Referring now to FIG. 4, a "forward scan" sound head assembly for use in a motion picture projector playing films with monophonic or stereophonic optical soundtracks (a Stereo Variable Area, SVA, soundtrack is depicted) is shown. Most analog sound heads employ forward scan in which the light source is placed on the emulsion side of the moving analog soundtrack and the image of a narrow slit is focused onto this the track. This narrow line of light is attenuated by the moving patterns on the soundtrack and impinges onto a solar cell which is placed on the opposite side of the film in order to collect as much light passing through the film as possible.

In accordance with a preferred embodiment of the invention, a red LED 30 provides a light source that passes through a condenser lens 32, a plate 34 with a slit 36, and an objective lens assembly 38, causing the image of the slit to be focussed onto the plane of the film soundtrack. For the playback of an SVA stereo optical soundtrack, a twin element solar cell 40 is located close to the rear of the film 42, and receives the light transmitted through the single-cyan-dye film soundtrack by the projected image of the slit.

The film wraps around a rotating sound drum 44 with its base side toward the drum and its emulsion side toward the lens assembly 38. The drum 44 positions the film between the light source/slit and solar cell. An adjustable guide roller 46 provides for precise lateral positioning of the film such that the film soundtrack elements LT and RT can be properly aligned laterally with respect to the image of the slit. The elements are aligned such that the respective portions of solar cell 40 receive substantially only the light modulated by the respective LT and RT tracks when the film is correctly positioned. Current outputs representing the LT and RT signals are thus present on the respective electrical leads 48 and 50 attached to the solar cell pair (lead 52 is a ground lead).

In a "reverse scan" arrangement, the solar cell and light source swap positions and the optics are reversed. Thus, the light source is placed on the base side of the film, where the solar cell 40 is located in the depicted forward scan arrangement. The light source is located in as close a proximity to the moving analog dye track as possible. The optics arrangement is reversed from that depicted in the forward scan arrangement of FIG. 4, such that the dye track is imaged onto the solar cell. The solar cell is located where the red LED 30 was located in the forward scan arrangement. The solar cell is masked by a slit such that it is only sensitive along a narrow line which is perpendicular to the travel of the soundtrack.

Figure 6:
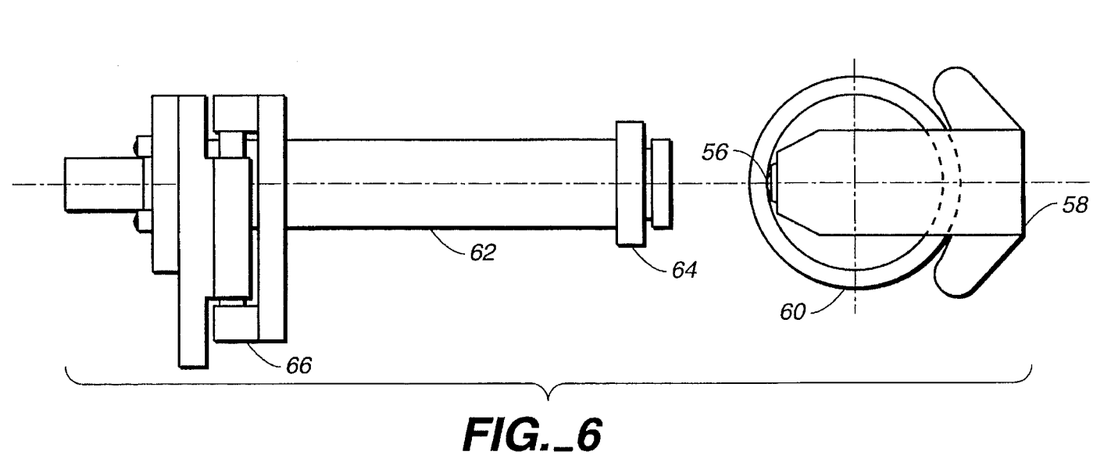
FIG. 6 is a side elevation view of a "reverse scan" motion picture projector sound head assembly arrangement useful for practicing the present invention.
Figure 7:
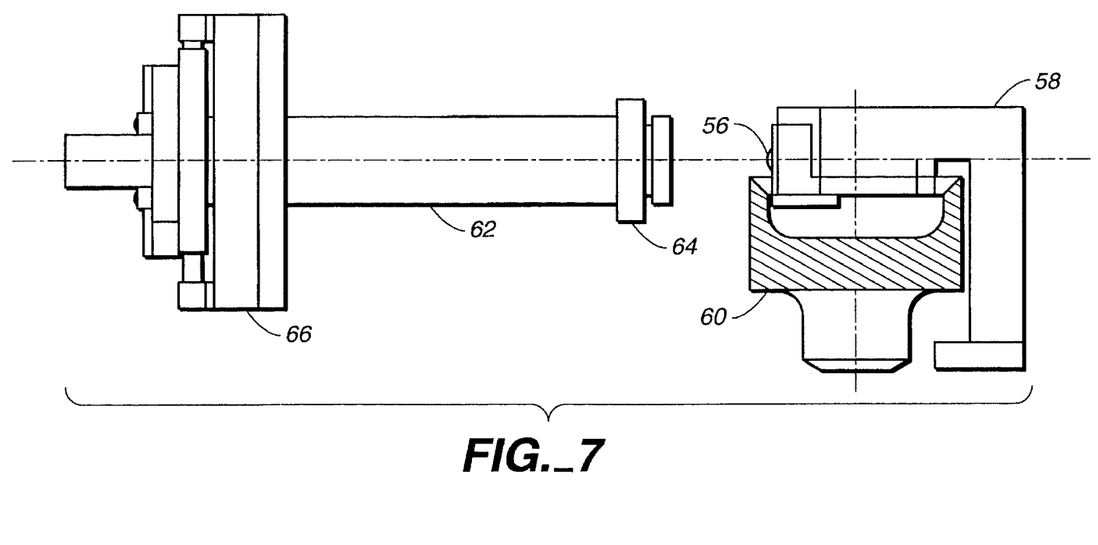
FIG. 7 is a top plan, partially cross-sectioned, view of the "reverse scan" assembly arrangement of FIG. 6.

Such a reverse scan arrangement is shown in FIGS. 6 and 7. A red LED 56 is held by an adjustable (for alignment) L-shaped support arm assembly 58 so that it is positioned adjacent the side of the rotating sound drum 60 from which the soundtrack-carrying edge of the film overhangs. For clarity, the film is not shown in FIGS. 6 and 7. Thus the red LED 56 is in close proximity to the moving analog dye track. In FIG. 7, a portion of the sound drum 60 is shown in cross section. A cylindrical tube 62 contains and supports the required optics, including a rotatable focusing lens 64 at its distal end, nearest the LED light source. An adjustable mounting assembly 66 supports the optics 62 and permits its alignment with the sound drum. The details of the adjustments for elements 58 and 66 are not shown. Preferably, the supports for optical assembly 62 and LED source 56 provide independent, non-interactive vertical, lateral and azimuth adjustments. The solar cell is within the optical assembly 62 and is not seen in the views of FIGS. 6 and 7. A reverse scan system which may be modified for use in the present invention is available from Kelmar Systems Inc. of New York, N.Y. The Kelmar device employs an infrared LED for use in reading conventional silver soundtracks. Other manufacturers of reverse scan systems employing infrared LEDs for use in reading conventional silver soundtracks include Cinemeccanica of Milan, Italy and Components Engineering of Seattle, Wash.

Whether located as in the forward scan arrangement or the reverse scan arrangement, the preferred embodiment calls for the use of a 660 nanometer red light emitting diode as the source of soundtrack reading illumination. This light source has been chosen because it can be readily obtained from several sources and produces a very narrow band of wavelengths, plus or minus about 10 to 15 nanometers around the 660 nanometer dominant wavelength. LED materials which conform to this specification are available from Hewlett-Packard, Showa Denko and Mitsubishi Cable. In the preferred embodiment, these materials are mounted on a TO-46 header, in a linear pattern which is approximately 0.1 inches in length by 0.02 inches in height. This pattern allows full illumination across the width of the dye track, while fully illuminating the narrow sensitive region of the solar cell, reading the light modulated by the dye track.

Low powered laser diodes, from SDL for example, which emit the appropriate wavelength, may also be used, but additional optics to reshape the columnated beam from this light source, such that it evenly illuminates the dye soundtrack, would be required. In addition, the use of carefully designed laser diode drive circuitry to minimize noise, would be required. Laser speckle at the detector may further increase the optical noise.

Solar Cell

In the preferred configuration, a 12.1 mm lens is used to focus the image of the dye track on a solar cell whose active element has a lateral dimension of 0.296 inches and has been masked by a slit such that it is only sensitive along a narrow line which is perpendicular to the travel of the soundtrack. The width of this narrow line sensitive region determines the maximum frequency response of the system. In conventional forward scan apparatus, if an analog frequency response of up to 16 kHz is desired (after electronic slit loss correction), a 0.0005 inch slit aperture is focused onto the emulsion side of the film. The width of this slit of light directly corresponds to the width of the solar cell's active area. In the preferred embodiment, the width of this active area is 0.00176 inches. Since the image of the scanned analog soundtrack is magnified to cover the lateral dimension of the solar cell's active element, in this case 0.296 inches, and the width of the scanned area on the analog soundtrack is physically 0.084 inches, the magnification ratio employed by the reverse scan apparatus under discussion is 3.52 to 1. Therefore, this 0.00176 inch active area corresponds to a 0.0005 inch slit width and provides the identical frequency response characteristics as those provided by the example conventional forward scan apparatus.

Since most movie soundtracks contain two channels within the approximate 0.1 inch confines of the soundtrack width, in order to provide a stereo presentation, this active element is divided into two separate regions, each reading one of the two channels of the dye soundtrack. A solar cell with this configuration is available from Centronics Inc. This solar cell exhibits no special spectral sensitivity characteristics. However, any solar cell with sufficient sensitivity in the 630 to 680 nanometer region may be employed, taking into consideration that the lower the solar cell output, the greater the amplification required, and the greater the electronic noise in the reproduced audio.

We claim:

1. A combination reproducing audio signals, comprising a three dye layer color motion picture film print, wherein the middle layer is a cyan layer, the print having a single-dye variable area analog soundtrack printed only in said cyan layer, a light-emitting diode emitting substantially monochromatic narrow-bandwidth light in a range of wavelengths within the red portion of the spectrum, complementary to that of said cyan dye, said diode disposed to illuminate one side of the film, and a signal-producing photocell or solar cell disposed on the other side of the film, opposite the diode, such that the cell senses light emitted from the diode and modulated by said single-dye soundtrack when the film is transported relative to the diode and the cell produces a signal representing the audio signals in said soundtrack.

2. The combination of claim 1 further comprising a rotating sound drum engaging said film, said diode disposed on the side of the film facing the sound drum.

* * * * *

UNITED STATES PATENT AND TRADEMARK OFFICE
CERTIFICATE OF CORRECTION

PATENT NO : 5,587,749
DATED : 12/24/96
INVENTOR(S): Paul R. Goldberg and Martin J. Richards It is certified that error appears in the above-identified patent and that said Letters Patent is hereby corrected as shown below:

Column 6 line 47 of the patent, "tile" should be --the--;

Column 6 line 53 of the patent, "tile" should be --the--;

Column 8 line 5 of the patent, "tile" should be --the--;

Column 8 line 5 of the patent, "tile" should be --the--;

Column 8 line 18 of the patent, "tile" should be --the--;

Column 8 line 43 of the patent, "notion" should be --motion--

Signed and Sealed this

Thirteenth Day of March, 2001

Attest:

NICHOLAS P. GODICI

Attesting Officer

Acting Director of the United States Patent and Trademark Office